US012255302B2

(12) United States Patent
Yoo et al.

(10) Patent No.: US 12,255,302 B2
(45) Date of Patent: Mar. 18, 2025

(54) ENERGY STORAGE APPARATUS AND ENERGY STORAGE SYSTEM

(71) Applicant: LG ENERGY SOLUTION, LTD., Seoul (KR)

(72) Inventors: Ji-Ho Yoo, Daejeon (KR); Dong-Ho Park, Daejeon (KR); Yong-Tae Lee, Daejeon (KR); Jong-Soo Lee, Daejeon (KR); Sang-Woo Hong, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 439 days.

(21) Appl. No.: 17/764,319

(22) PCT Filed: Dec. 30, 2020

(86) PCT No.: PCT/KR2020/019441
§ 371 (c)(1),
(2) Date: Mar. 28, 2022

(87) PCT Pub. No.: WO2021/137634
PCT Pub. Date: Jul. 8, 2021

(65) Prior Publication Data
US 2022/0344746 A1     Oct. 27, 2022

(30) Foreign Application Priority Data

Jan. 3, 2020  (KR) .......................... 10-2020-0001059

(51) Int. Cl.
*H01M 10/6563* (2014.01)
*H01M 10/613* (2014.01)
(Continued)

(52) U.S. Cl.
CPC ..... *H01M 10/6563* (2015.04); *H01M 10/613* (2015.04); *H01M 10/63* (2015.04);
(Continued)

(58) Field of Classification Search
CPC .......... H01M 10/6563; H01M 10/613; H01M 10/63; H01M 10/653; H01M 10/6566;
(Continued)

(56) References Cited

U.S. PATENT DOCUMENTS 11,473,977 B2 * 10/2022 Lee ........................... G01J 5/10
2017/0301967 A1 * 10/2017 Kim ....................... H01M 10/63
(Continued)

FOREIGN PATENT DOCUMENTS

CN      103582975 A      2/2014
CN      107507934 A     12/2017
(Continued)

OTHER PUBLICATIONS

International Search Report (PCT/ISA/210) issued in PCT/KR2020/019441. dated Apr. 21, 2021.
(Continued)

*Primary Examiner* — Abdullah A Riyami
*Assistant Examiner* — Nader J Alhawamdeh
(74) *Attorney, Agent, or Firm* — Birch, Stewart, Kolasch & Birch, LLP

(57) ABSTRACT

An energy storage apparatus includes at least one battery rack having at least two battery packs; a container configured to accommodate the at least one battery rack; and an air conditioner provided with a coolant supply part, which includes at least two blowout units respectively having a nozzle with a discharge hole through which a coolant is discharged and configured to individually switch a discharge direction of the coolant, toward any, one of the at least two battery packs and individually increase or decrease a discharge amount of the coolant and a control unit configured to adjust the discharge direction and the discharge amount of
(Continued)

the coolant of each of the at least two blowout units, and a coolant suction part configured to suck a heated coolant inside the container.

11 Claims, 11 Drawing Sheets

(51) Int. Cl.
  *H01M 10/63* (2014.01)
  *H01M 10/653* (2014.01)
  *H01M 10/6566* (2014.01)
  *H01M 10/663* (2014.01)
  *H01M 50/204* (2021.01)
(52) U.S. Cl.
  CPC ..... *H01M 10/653* (2015.04); *H01M 10/6566* (2015.04); *H01M 10/663* (2015.04); *H01M 50/204* (2021.01)
(58) Field of Classification Search
  CPC ............ H01M 10/663; H01M 50/204; H01M 2220/10; H01M 10/486; H01M 10/617; H01M 10/625; H01M 10/627; H01M 10/647; H01M 10/6556; H01M 10/6557; H01M 10/6565; H01M 10/6568; H01M 50/20; H01M 50/251; Y02P 70/50; Y02E 60/10
  See application file for complete search history.

(56) References Cited

U.S. PATENT DOCUMENTS

| | | | |
|---|---|---|---|
| 2018/0361858 A1 | 12/2018 | Hirsch et al. | |
| 2022/0344746 A1* | 10/2022 | Yoo | H01M 10/625 |
| 2023/0170574 A1* | 6/2023 | Latulipe | H01M 50/204 429/53 |
| 2023/0352772 A1* | 11/2023 | Shi | H01M 10/63 |
| 2024/0047766 A1* | 2/2024 | McConnell | H01M 10/627 |

FOREIGN PATENT DOCUMENTS

| | | | |
|---|---|---|---|
| CN | 108738100 A | | 11/2018 |
| CN | 109585968 A | | 4/2019 |
| CN | 110137618 A | | 8/2019 |
| CN | 110165110 A | | 8/2019 |
| CN | 209418721 U | | 9/2019 |
| JP | 5-118614 A | | 5/1993 |
| JP | 10-208781 A | | 8/1998 |
| JP | 2001-15090 A | | 1/2001 |
| JP | 2008-46689 A | | 2/2008 |
| JP | 2010-114989 A | | 5/2010 |
| JP | 3168394 U | | 6/2011 |
| JP | 2015-37026 A | | 2/2015 |
| JP | 2015-37044 A | | 2/2015 |
| JP | 2015037044 A | * | 2/2015 |
| JP | 2015-60798 A | | 3/2015 |
| JP | 2022-534233 A | | 7/2022 |
| KR | 20-1998-032210 U | | 8/1998 |
| KR | 10-2006-0061252 A | | 7/2006 |
| KR | 10-2013-0051102 A | | 5/2013 |
| KR | 10-2015-0078643 A | | 7/2015 |
| KR | 10-1684295 B1 | | 1/2016 |
| KR | 10-2020569 B1 | | 9/2019 |
| KR | 10-2021072 B1 | | 11/2019 |
| KR | 10-2058161 B1 | | 12/2019 |

OTHER PUBLICATIONS

European Search Report issued in European Patent Application No. 20 91 0157, dated Sep. 23, 2022.

* cited by examiner

FIG. 12

※Specifications to which Computational Fluid Dynamics Simulation is applied

| | | |
|---|---|---|
| Numerical Model | Governing Equation | Steady Mass Conservation Equation |
| | | Steady X Momentum Equation |
| | | Steady Y Momentum Equation |
| | | Steady Z Momentum Equation |
| | | Steady Standard K-Epsilon Turbulence Model |
| | | Transient Energy Equation |
| | Lattice Type | Trimmer Mesh (Prism Layer added to simulate Air Boundary Layer) |
| | Number of Lattices | 17.1 million or above |
| | Time Step | 5s |
| HVAC Specifications | Cooling Capability | 58.2kW × 2set |
| | Discharge Amount | 7,800CMH × 2set |
| Application Conditions | Pack Type | JH3_3P_ACP |
| | Max. CP Rate | 0.33CP Continuous Charge/Discharge Power Pattern |
| | Pack Amount | 17EA |
| | Battery Rack Amount | 30EA |

FIG. 13

EXAMPLE 1 Simulation Temperature Analysis (Unit : ℃)

| | Rack#1 | Rack#2 | Rack#3 | Rack#4 | Rack#5 | Rack#6 | Rack#7 | Rack#8 | Rack#9 | Rack#10 | Rack#11 | Rack#12 | Rack#13 | Rack#14 | Rack#15 |
|---|---|---|---|---|---|---|---|---|---|---|---|---|---|---|---|
| Pack Highest Temperature | 29.44 | 29.05 | 27.97 | 28.49 | 29.31 | 29.30 | 29.56 | 28.64 | 29.55 | 30.02 | 28.99 | 29.14 | 29.05 | 28.20 | 29.77 |
| Pack Lowest Temperature | 27.28 | 27.09 | 26.52 | 26.55 | 26.60 | 26.70 | 27.04 | 26.96 | 26.98 | 26.82 | 26.89 | 26.67 | 26.51 | 26.71 | 27.25 |
| Temperature Deviation | 2.16 | 1.96 | 1.46 | 1.94 | 2.71 | 2.60 | 2.52 | 1.68 | 2.58 | 3.20 | 2.11 | 2.48 | 2.53 | 1.49 | 2.52 |
| | Rack#16 | Rack#17 | Rack#18 | Rack#19 | Rack#20 | Rack#21 | Rack#22 | Rack#23 | Rack#24 | Rack#25 | Rack#26 | Rack#27 | Rack#28 | Rack#29 | Rack#30 |
| Pack Highest Temperature | 29.81 | 28.01 | 28.77 | 29.23 | 29.03 | 29.68 | 29.90 | 28.79 | 29.47 | 29.86 | 29.31 | 29.20 | 28.96 | 29.19 | 29.31 |
| Pack Lowest Temperature | 27.03 | 26.58 | 26.54 | 26.63 | 26.72 | 26.93 | 26.98 | 26.96 | 26.99 | 26.64 | 26.79 | 26.75 | 26.97 | 27.34 | 27.86 |
| Temperature Deviation | 2.78 | 1.43 | 2.23 | 2.60 | 2.31 | 2.75 | 2.91 | 1.83 | 2.48 | 3.21 | 2.52 | 2.44 | 1.99 | 1.85 | 1.45 |

| Entire Pack Highest Temperature | 30.02 | (Rack#10, One-stage Battery Pack) |
|---|---|---|
| Entire Pack Lowest Temperature | 26.51 | (Rack#13 Eight-stage Battery Pack) |
| Entire Pack Average Temperature | 27.68 | - |
| Entire Rack Maximum Deviation | 3.21 | (Rack#25) |

FIG. 14

COMPARATIVE EXAMPLE 1 Simulation Temperature Analysis (Unit : ℃)

| | Rack#1 | Rack#2 | Rack#3 | Rack#4 | Rack#5 | Rack#6 | Rack#7 | Rack#8 | Rack#9 | Rack#10 | Rack#11 | Rack#12 | Rack#13 | Rack#14 | Rack#15 |
|---|---|---|---|---|---|---|---|---|---|---|---|---|---|---|---|
| Pack Highest Temperature | 30.56 | 30.60 | 30.46 | 30.38 | 30.45 | 30.94 | 31.12 | 31.12 | 29.96 | 30.71 | 28.57 | 29.22 | 29.32 | 29.39 | 29.22 |
| Pack Lowest Temperature | 29.03 | 29.37 | 29.41 | 29.30 | 28.57 | 28.05 | 27.78 | 27.62 | 27.37 | 27.11 | 26.78 | 26.79 | 26.95 | 27.33 | 27.89 |
| Temperature Deviation | 1.52 | 1.23 | 1.06 | 1.08 | 1.88 | 2.89 | 3.34 | 3.50 | 2.59 | 3.60 | 1.79 | 2.43 | 2.38 | 2.05 | 1.33 |

| | Rack#16 | Rack#17 | Rack#18 | Rack#19 | Rack#20 | Rack#21 | Rack#22 | Rack#23 | Rack#24 | Rack#25 | Rack#26 | Rack#27 | Rack#28 | Rack#29 | Rack#30 |
|---|---|---|---|---|---|---|---|---|---|---|---|---|---|---|---|
| Pack Highest Temperature | 29.71 | 29.92 | 29.95 | 29.94 | 29.40 | 30.70 | 30.51 | 30.57 | 31.21 | 31.21 | 29.58 | 29.63 | 30.43 | 30.98 | 30.92 |
| Pack Lowest Temperature | 28.08 | 27.47 | 27.24 | 27.09 | 27.08 | 27.39 | 27.44 | 27.46 | 27.40 | 27.58 | 28.28 | 28.76 | 28.81 | 28.79 | 28.28 |
| Temperature Deviation | 1.63 | 2.44 | 2.71 | 2.84 | 2.32 | 3.31 | 3.07 | 3.11 | 3.81 | 3.63 | 1.30 | 0.87 | 1.62 | 2.19 | 2.64 |

| Entire Pack Highest Temperature | 31.21 | (Rack#24, One-stage Battery Pack) |
|---|---|---|
| Entire Pack Lowest Temperature | 26.78 | (Rack#11 Sixteen-stage Battery Pack) |
| Entire Pack Average Temperature | 28.77 | - |
| Entire Pack Maximum Deviation | 3.81 | (Rack#24) |

ENERGY STORAGE APPARATUS AND ENERGY STORAGE SYSTEM

TECHNICAL FIELD

The present disclosure relates to an energy storage apparatus and an energy storage system, and more particularly, to an energy storage apparatus and an energy storage system with improved cooling efficiency and proper coolant supply capability.

The present application claims priority to Korean Patent Application No. 10-2020-0001059 filed on Jan. 3, 2020 in the Republic of Korea, the disclosures of which are incorporated herein by reference.

BACKGROUND ART

Secondary batteries currently commercialized include nickel cadmium batteries, nickel hydrogen batteries, nickel zinc batteries, lithium secondary batteries and so on. Among them, the lithium secondary batteries are more highlighted in comparison to nickel-based secondary batteries due to advantages such as free charging and discharging, caused by substantially no memory effect, very low self-discharge rate, and high energy density.

The lithium secondary battery mainly uses lithium-based oxides and carbonaceous materials as a positive electrode active material and a negative electrode active material, respectively. The lithium secondary battery includes an electrode assembly in which a positive electrode plate coated with the positive electrode active material and a negative electrode plate coated with the negative electrode active material are disposed with a separator being interposed therebetween, and an exterior, namely a battery pouch exterior, hermetically containing the electrode assembly together with an electrolyte.

Recently, secondary batteries are widely used not only in small devices such as portable electronic devices, but also in middle-sized or large-sized devices such as vehicles and energy storage devices. When used in such a middle-sized device, a large number of secondary batteries are electrically connected to increase capacity and output. In particular, pouch-type secondary batteries are widely used in such middle-sized and large-sized devices due to the advantage of easy stacking.

Meanwhile, recently, as the need for a large-capacity structure increases along with the use as an energy storage source, there is an increasing demand for an energy storage apparatus that includes a plurality of battery racks, each having a plurality of battery packs respectively accommodating a plurality of secondary batteries therein, a container for storing the plurality of battery racks therein, and an air conditioner for cooling the plurality of battery racks.

In addition, in a conventional general air conditioner of the energy storage apparatus, temperature deviation inevitably occurs between the plurality of battery racks and between the plurality of battery packs according to the locations of the plurality of battery racks and the plurality of battery packs.

For example, in a conventional general air conditioning method in a battery system, the surface of the battery pack is cooled while supplying a cold cooling air to an upper portion or a lower portion of a container wall. However, the air conditioning method has a problem in that the temperature deviation among the plurality of battery packs may easily increase depending on the operating conditions (weather, charging/discharging patterns, and air conditioning types) of the energy storage apparatus. Accordingly, among the plurality of battery packs, any battery pack having a high temperature may be deteriorated to shorten the lifespan, thereby increasing the maintenance cost of the energy storage apparatus.

Accordingly, there is a need for a method to effectively reduce temperature variation among the plurality of battery packs accommodated in the container.

DISCLOSURE

Technical Problem

The present disclosure is designed to solve the problems of the related art, and therefore the present disclosure is directed to providing an energy storage apparatus and an energy storage system with improved cooling efficiency and proper coolant supply capability.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided an energy storage apparatus, comprising:
 at least one battery rack having at least two battery packs;
 a container configured to accommodate the at least one battery rack; and
 an air conditioner provided with a coolant supplier, the coolant supplier including at least two blowers, each blower respectively having a nozzle with a discharge hole through which a coolant is discharged and configured to individually switch a discharge direction of the coolant toward any one of the at least two battery packs and individually increase or decrease a discharge amount of the coolant and a control unit configured to adjust the discharge direction and the discharge amount of the coolant of each of the at least two blowers, and a coolant suction part configured to suck a heated coolant inside the container.

Moreover, the control unit may be configured to adjust the discharge direction of each of the at least two blowers so that the coolant is concentrated to a battery pack of the at least two battery packs exhibiting a relatively higher temperature.

In addition, the control unit may be configured to adjust so that a the discharge amount of a first blower of the at least two blowers discharging the coolant toward a battery pack of the at least two battery packs exhibiting a relatively higher temperature to be greater than the discharge amount of a second blower of the at least two blowers.

Further, the coolant supplier may include an air supply duct having a moving passage for moving the coolant to the at least two blowers, and
 the coolant suction part may include a suction duct having a suction hole for sucking the coolant inside the container and configured to extend so that the coolant is moved to outside of the container.

Also, each blower of the at least two blowers may include:
 a fixing member fixed to the air supply duct and having an inlet formed to communicate with the air supply duct;
 a body coupled to the fixing member and configured to have a curved surface that is rotatable;

a blowout nozzle having a discharge hole formed by opening an end of the body to discharge the coolant; and a shutter configured movably to cover at least a portion of the discharge hole of the blowout nozzle.

In addition, the blowout nozzle may include an elongated tube configured to change in length in the discharge direction.

Further, the battery rack may include a guide member having an inclined wall configured to protrude outward based on a location of a battery pack of the at least two battery packs so that the coolant around the battery pack is guided to move to the battery pack.

Also, the inclined wall may be connected using a hinge so that the degree of outward protrusion thereof is changed based on the location of the battery pack.

Moreover, the guide member may include a conduction portion made of a thermally conductive material and configured to extend into the battery rack from an inner end of the inclined wall.

In addition, the suction duct may be configured to be at least partially movable so that at least a portion of the suction hole is moved.

In another aspect of the present disclosure, there is also provided an energy storage system, comprising at least two energy storage apparatuses as above.

Advantageous Effects

According to an embodiment of the present disclosure, since the present disclosure includes the coolant supply part having at least two blowout units configured to individually switch the discharge direction of the coolant toward any one of the at least two battery packs and individually increase or decrease the discharge amount of the coolant and a control unit configured to control the discharge direction and the discharge amount of the coolant of each of the plurality of battery packs, it is possible that more coolant is brought into contact with a specific battery pack requiring intensively cooling among the plurality of battery packs.

Also, according to an embodiment of the present disclosure, since the control unit is configured to adjust the blowing direction of each of the at least two blowout unit so that the coolant is concentrated only to some battery packs exhibiting a relatively higher temperature among the at least two battery packs, it is possible to perform spot cooling on a specific battery pack having a relatively higher temperature than the remaining battery packs. That is, in the present disclosure, since only some specific battery packs that require intensive cooling among the plurality of battery packs may be quickly cooled, it is possible to reduce the temperature deviation of the battery packs and effectively prevent the battery pack from deteriorating by quick cooling.

In addition, according to an embodiment of the present disclosure, since the blowout unit includes a fixing member fixed to the air supply duct and having an inlet formed to communicate with the inside of the air supply duct, a body coupled to the fixing member and having a curved surface so as to be rotatable in a state of being coupled, a blowout nozzle formed by opening an end of the body to discharge the coolant, and a shutter configured to be movable to cover at least a portion of the opening of the blowout nozzle, it is possible to efficiently control the discharge direction and the discharge amount of the coolant discharged by the blowout nozzle. Accordingly, in the present disclosure, a battery pack requiring intensive cooling may be cooled more quickly among at least two battery packs.

Further, according to another embodiment of the present disclosure, in the battery rack, since the guide member having an inclined wall protruding outward based on the location of the battery pack is provided in the accommodation portion in which the battery pack is mounted so that the coolant is guided to move to the battery pack, it is possible to effectively deliver the coolant to the battery pack located at a relatively far distance from the blowout unit among the plurality of battery packs. In other words, in the present disclosure, by using the guide member, it is possible to solve the problem that after the blowout unit discharges a cooling air, the point cooling efficiency deteriorates as the cooling air spreads seriously in all directions due to a long moving distance of the cooling air.

Also, according to another embodiment of the present disclosure, since the guide member is connected using the hinge structure so that the degree of outward protrusion of the inclined wall may be changed based on the location of the battery pack, it is possible to increase the amount of coolant that comes into contact with a specific battery pack by spreading the inclined wall of the guide member. Accordingly, in the present disclosure, it is possible to solve the problem that the point cooling efficiency deteriorates according to the distance between the blowout unit and the battery pack.

Moreover, according to another embodiment of the present disclosure, since the suction duct is configured such that the location of the suction hole is movable, it is possible to control a coolant to be concentrated to a battery rack requiring more cooling among the plurality of battery racks. Accordingly, it is possible to effectively reduce the temperature deviation among the plurality of battery racks. Ultimately, it is possible to effectively extend the service life of the energy storage apparatus.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

FIG. 12 is a table showing the specification to which the simulation of the experimental example of the present disclosure is applied.

FIG. 13 is a table showing the simulation analysis result of Example 1 of the experimental example of the present disclosure.

FIG. 14 is a table showing the simulation analysis result of Comparative Example 1 of the experimental example of the present disclosure.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
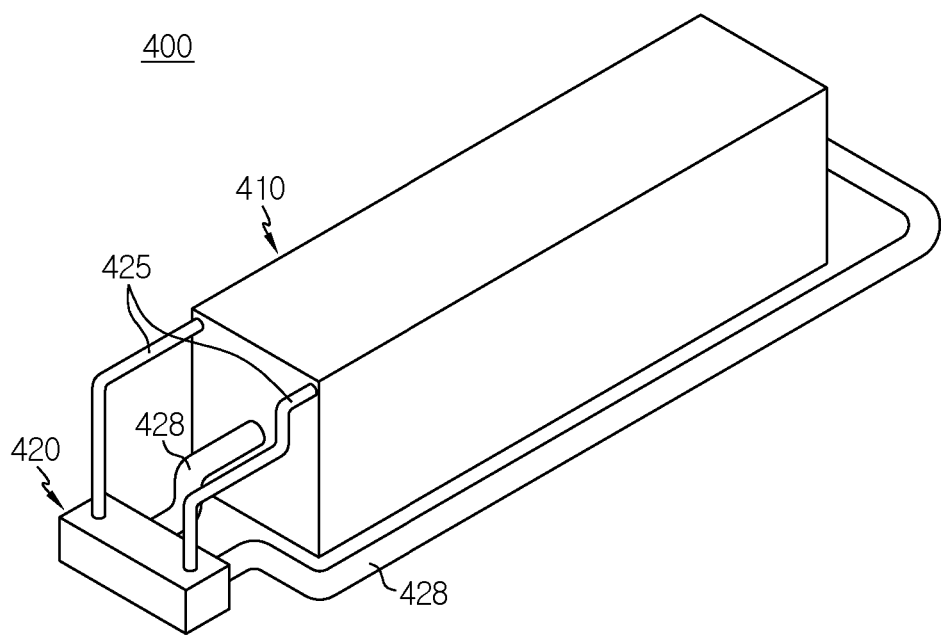
FIG. 1 is a perspective view schematically showing an energy storage apparatus according to an embodiment of the present disclosure.
Figure 2:
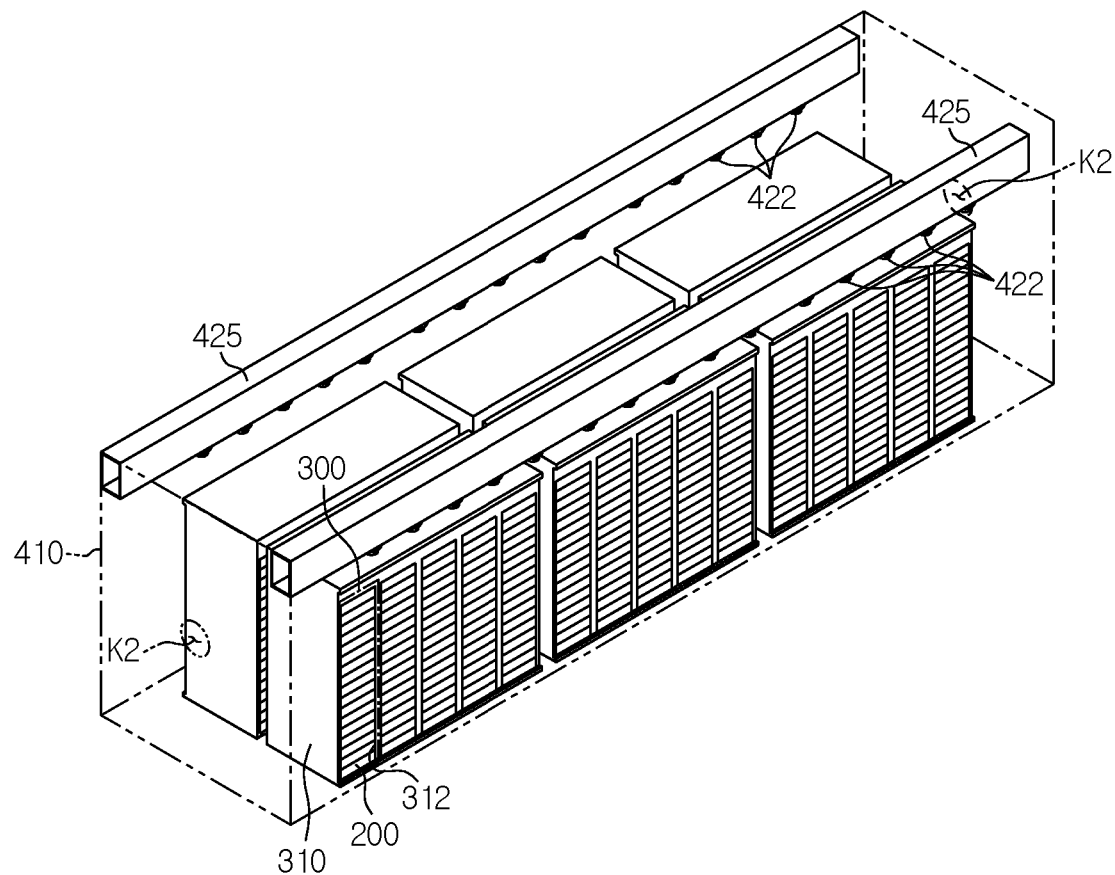
FIG. 2 is a perspective view schematically showing some components of the energy storage apparatus according to an embodiment of the present disclosure.
Figure 3:
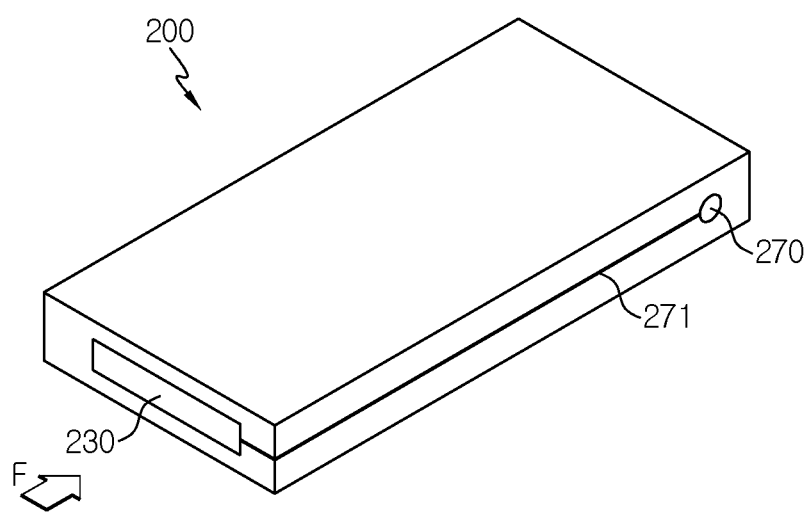
FIG. 3 is a perspective view schematically showing a battery pack, employed at the energy storage apparatus according to an embodiment of the present disclosure.
Figure 4:
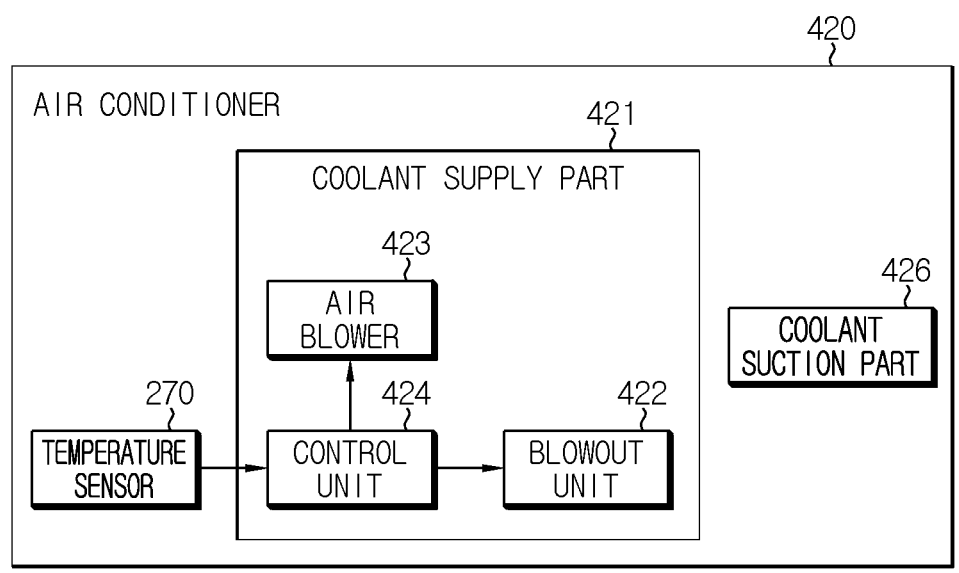
FIG. 4 is a diagram showing an internal components of an air conditioner, employed at the energy storage apparatus according to an embodiment of the present disclosure.

FIG. 1 is a perspective view schematically showing an energy storage apparatus according to an embodiment of the present disclosure. FIG. 2 is a perspective view schematically showing some components of the energy storage apparatus according to an embodiment of the present disclosure. FIG. 3 is a perspective view schematically showing a battery pack, employed at the energy storage apparatus according to an embodiment of the present disclosure. Also, FIG. 4 is a diagram showing an internal components of an air conditioner, employed at the energy storage apparatus according to an embodiment of the present disclosure.

Referring to FIGS. 1 to 4, an energy storage apparatus 400 of the present disclosure may include at least one battery rack 300, a container 410 for accommodating the battery rack 300, and an air conditioner 420.

Here, the battery rack 300 includes a plurality of battery packs 200 arranged in one row in an upper and lower direction, and a rack case 310 for accommodating the plurality of battery packs 200. Here, regarding the battery rack 300 of the present disclosure, the plurality of battery packs 200 arranged in one row in an upper and lower direction and mounted in an accommodation portion 312 of the rack case 310 are defined as one battery rack 300. In addition, one rack case 310 may include a plurality of battery packs 200.

First, the plurality of battery packs 200 may be configured to be accommodated in the rack case 310 to be form arranged in an upper and lower direction. In addition, the plurality of battery packs 200 may include a pack housing 210 and a plurality of secondary batteries (not shown) provided inside the pack housing 210 and stacked in one direction.

Specifically, the secondary battery may be a pouch-type secondary battery. In particular, the pouch-type secondary battery may include an electrode assembly (not shown), an electrolyte (not shown), and a pouch.

Each secondary battery may be disposed to be vertically erect on the ground so that two wide sides are located in front and rear directions and sealing portions are located in upper, lower, left and right directions. In other words, each secondary battery may be configured to be erect in an upper and lower direction. Meanwhile, in this specification, unless otherwise specified, upper, lower, front, rear, left and right directions will be set based on when viewed in the F direction.

Here, the pouch may be configured to have an accommodation portion with a concave shape. In addition, the electrode assembly and the electrolyte may be accommodated in the accommodation portion. In addition, each pouch includes an outer insulation layer, a metal layer and an inner adhesive layer, and the inner adhesive layers may be adhered to each other at an edge of the pouch to form a sealing portion. Further, a terrace portion may be formed at left and right ends of the secondary battery, respectively, where a positive electrode lead and a negative electrode lead are formed.

In addition, the electrode assembly is an assembly of an electrode plate coated with an electrode active material and a separator, and at least one positive electrode plate and at least one negative electrode plate may be disposed therein with the separator being interposed therebetween. In addition, a positive electrode tab may be provided on the positive electrode plate of the electrode assembly, and at least one positive electrode tab may be connected to the positive electrode lead.

Here, the positive electrode lead has one end connected to the positive electrode tab and the other end exposed out of the pouch, and the exposed portion may function as an electrode terminal of the secondary battery, for example a positive electrode terminal of the secondary battery.

In addition, a negative electrode tab is provided on the negative electrode plate of the electrode assembly, and at least one negative electrode tab may be connected to the negative electrode lead. Also, the negative electrode lead may have one end connected to the negative electrode tab and the other end exposed out of the pouch, and the exposed portion may function as an electrode terminal of the secondary battery, for example a negative electrode terminal of the secondary battery.

Moreover, the battery pack 200 may include at least one bus bar (not shown) configured to electrically interconnect the plurality of secondary batteries to each other. Specifically, the bus bar may be made of a conductive metal, for example copper, aluminum, nickel, or the like.

Meanwhile, referring to FIG. 2 again, the rack case 310 may include the accommodation portion 312 with a storage space having one open side to accommodate and store the plurality of battery packs 200, respectively. The plurality of accommodation portions 312 may be configured such that the plurality of battery packs 200 are mounted in an upper and lower direction. Alternatively, the accommodation portions 312 may be configured such that the plurality of battery packs 200 are disposed to be spaced apart from each other at predetermined intervals.

Further, each of the plurality of accommodation portions 312 may include a shelf frame (not shown) configured so that the battery pack 200 is mounted to an upper portion thereof. Specifically, the shelf frame may have a plate shape extending in a direction (a horizontal direction) perpendicular to an outer wall of the rack case 310 extending in an upper and lower direction.

In addition, the battery pack 200 may include a temperature sensor 270 and a pack BMS 230. The temperature sensor 270 may be configured to measure an internal temperature of the battery pack 200. For example, the temperature sensor 270 may be connected to a sensing wire 271 to communicate with the pack BMS 230. Alternatively, the temperature sensor 270 may be connected to a control unit 424 (FIG. 4), explained later, through the sensing wire.

In addition, the pack BMS 230 may be configured to transmit temperature information of the temperature sensor 270 through wireless communication. To this end, the pack BMS 230 may include an NFC wireless communication unit, a Bluetooth wireless communication unit, or an RFID wireless communication unit. The pack BMS 230 may be configured to wirelessly communicate with a rack BMS (not shown). For example, the pack BMS 230 may receive internal temperature information of the battery pack 200 from the temperature sensor 270 and transmit the temperature information to the rack BMS in a wireless communication method. Alternatively, the pack BMS 230 may receive internal temperature information of the battery pack 200 from the temperature sensor 270 and transmit the temperature information through a wireless communication method to the control unit 424 (FIG. 4), explained later.

Moreover, the rack case 310 may include a rack BMS (not shown) configured to enable wireless communication with the pack BMS 230. The rack BMS may have a receiver unit (not shown) for wireless signals, which is configured to receive the temperature information from the pack BMS 230. In addition, the rack BMS may receive information such as current and voltage from the pack BMS 230.

Meanwhile, the container 410 may have an internal space to accommodate the at least one battery rack 300. The container 410 may have an outer wall to form the exterior of the energy storage apparatus 400. For example, the container 410 may be a general type of container 410 that may store articles therein. Here, the container will not be described in detail.

Meanwhile, the air conditioner 420 may control a coolant to be supplied and discharged by means of the temperature sensor 270 and the control unit 424. The air conditioner 420 may control a supply amount and discharge amount of a coolant (not shown) based on the temperature of the battery pack 200 measured by the temperature sensor 270. When the coolant supplied from the air conditioner 420 (e.g., a cooled air) comes into contact with the battery pack 200, the temperature of the coolant rises, and the heated coolant may be sucked and discharged again by the air conditioner 420.

Specifically, the air conditioner 420 may include a coolant supply part 421 and a coolant suction part 426. More specifically, the coolant supply part 421 may include an air supply duct 425, at least two blowout units 422, and a control unit 424.

First, the air supply duct 425 may be configured to move a coolant having a lower temperature than the battery pack 200 to the blowout unit 422. The air supply duct 425 may have a moving passage through which the coolant is moved. For example, as shown in FIG. 2, the air supply duct 425 may be connected to an external heat exchange device (not shown) configured to cool the heated coolant. That is, the air supply duct 425 may be shaped to extend from the heat exchange device and pass through the outer wall of the container 410.

Figure 5:
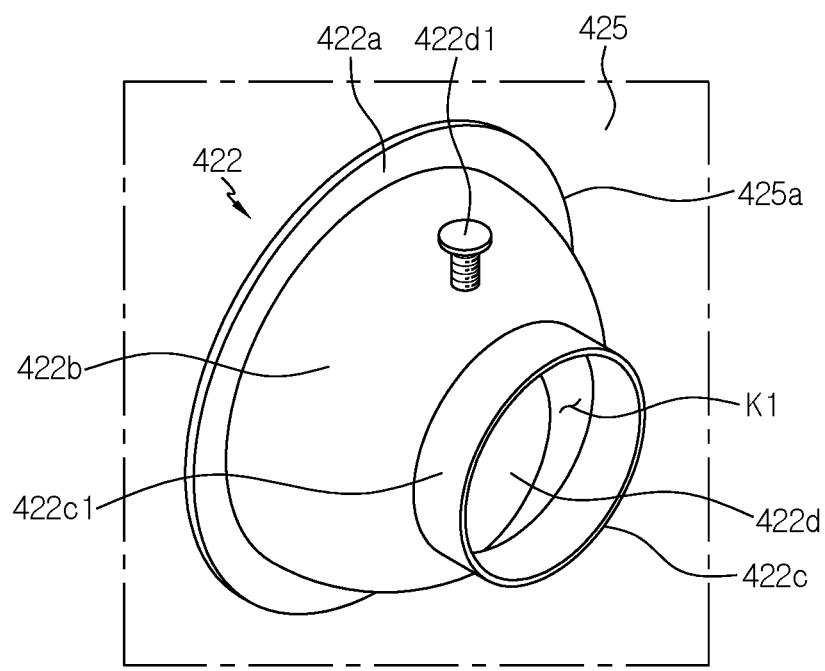
FIG. 5 is a partial perspective view schematically showing a blowout unit, employed at the energy storage apparatus according to an embodiment of the present disclosure.

FIG. 5 is a partial perspective view schematically showing a blowout unit, employed at the energy storage apparatus according to an embodiment of the present disclosure.

Referring to FIG. 5 along with FIGS. 1 to 4, each blowout unit 422 may include a nozzle having a discharge hole K1 through which the coolant is discharged. The nozzle may have the discharge hole K1 protruding in a discharge direction so that the discharged coolant mostly moves in one direction. The blowout unit 422 may discharge the coolant toward any one of the at least two battery packs 200. In addition, each of the at least two blowout units 422 may be configured to switch the discharge direction of the coolant individually and increase or decrease the discharge amount of the coolant individually.

Further, the control unit 424 may be configured to control the discharge direction and the discharge amount of the coolant of each of the at least two blowout units 422. For example, the control unit 424 may control the degree of opening of the discharge hole K1 of the blowout unit 422 to be increased or decreased. In addition, the control unit 424 may move the direction of the nozzle of the blowout unit 422 toward any one of the at least two battery packs 200.

In addition, the coolant suction part 426 may be configured to suck the heated coolant, if the coolant supplied from the coolant supply part 421 is heated by absorbing heat of the battery pack 200. For example, the coolant suction part 426 may include a suction duct 428 and a suction hole K2 formed in the suction duct 428. The present disclosure is not necessarily limited to the structural features of the suction duct 428 shown in FIG. 2, and if necessary, the suction duct 428 may be configured to extend to the inner space of the container 410.

Moreover, the air conditioner 420 may be configured to be connected to an external heat exchange device (not shown). That is, the air conditioner 420 may receive a cooled coolant from the heat exchange device or may send a heated coolant thereto. The heat exchange device may lower the temperature of the coolant by condensing or thermally radiating the heated coolant received from the air conditioner 420.

Therefore, according to this configuration of the present disclosure, since the present disclosure includes the coolant supply part 421 having at least two blowout units 422 configured to individually switch the discharge direction of the coolant toward any one of the at least two battery packs 200 and individually increase or decrease the discharge amount of the coolant and a control unit 424 configured to control the discharge direction and the discharge amount of the coolant of each of the plurality of battery packs 200, it is possible that more coolant is brought into contact with a specific battery pack 200 requiring intensively cooling among the plurality of battery packs 200.

For example, each of the at least two blowout units 422 may discharge a coolant to the battery pack 200 exhibiting a highest temperature among the plurality of battery packs 200 to rapidly cool the high-temperature battery pack 200. Accordingly, it is possible to minimize the temperature deviation of the at least two battery packs 200 accommodated in the battery rack 300, thereby preventing the service life of the battery pack 200 from decreasing due to deterioration.

Referring to FIG. 4 again along with FIG. 2, the control unit 424 of the air conditioner 420 may operate an air blower 423 to supply a coolant from an external heat exchange device to the air supply duct 425. In this case, the control unit 424 may receive temperature information of the battery pack 200 from the temperature sensor 270 attached to the battery pack 200 and determine whether to operate the air blower 423.

In addition, the control unit 424 may be configured to adjust a blowing direction of each of the at least two blowout units 422 so that the coolant is concentrated only to some battery packs 200 exhibiting a relatively higher temperature among the at least two battery packs 200. For example, if the control unit 424 receives a temperature value higher than a reference value from the temperature sensor 270 provided to each of the at least two battery packs 200, the control unit 424 may allow a coolant to be concentrated only to some battery packs 200 exhibiting a high temperature by adjusting the discharge direction of the at least two blowout units 422 toward the battery pack 200 exceeding the reference value.

Therefore, according to this configuration of the present disclosure, since the control unit 424 is configured to adjust the blowing direction of each of the at least two blowout unit 422 so that the coolant is concentrated only to some battery packs 200 exhibiting a relatively higher temperature among the at least two battery packs 200, it is possible to perform spot cooling on a specific battery pack 200 having a relatively higher temperature than the remaining battery packs 200. That is, in the present disclosure, since only some specific battery packs that require intensive cooling among the plurality of battery packs 200 may be quickly cooled, it is possible to reduce the temperature deviation of the battery packs 200 and effectively prevent the battery pack 200 from deteriorating by quick cooling.

Moreover, the control unit 424 may be configured to adjust so that the discharge amount of the blowout unit 422 discharging the coolant toward the battery pack 200 exhibiting a relatively higher temperature among the at least two battery packs 200 is larger than that of the remaining blowout unit 422.

For example, if the control unit 424 receives a temperature value higher than the reference value from the temperature sensor 270 provided to each of the at least two battery packs 200, the control unit 424 may increase the amount of coolant supplied to some battery pack 200 exhibiting a high temperature by adjusting the discharge amount of the at least two blowout units 422 toward the battery pack 200 exceeding the reference temperature value.

Meanwhile, referring to FIG. 2 again, the suction duct 428 of the coolant suction part 426 may have a moving space formed therein so that the coolant inside the container 410 may move to the outside of the container 410, and may have a shape extending to the outside of the container 410. In addition, the suction duct 428 may have a suction hole K2 configured to suck the heated coolant again.

Referring to FIGS. 2, 4 and 5 again, the blowout unit 422 may include a fixing member 422a, a body 422b, a blowout nozzle 422c, and a shutter 422d.

Specifically, the fixing member 422a may be fixed to the air supply duct 425 in a movable form. That is, the fixing member 422a may be formed in a portion of the air supply duct 425 where the blowout unit 422 needs to be formed. In addition, the fixing member 422a may be coupled to the outer wall of the air supply duct 425 by bolting or male-female fastening so as to be detachable if necessary.

For example, the fixing member 422a may have a ring shape. In addition, the fixing member 422a may be configured to be coupled to an edge portion 425a of an opening formed in the air supply duct 425. The fixing member 422a may have an inlet formed to communicate with the opening of the air supply duct 425.

In addition, the body 422b may be configured to be coupled to the fixing member 422a in a movable form. For example, the body 422b may have a curved surface so as to be rotatable in state of being coupled to the fixing member 422a. In this case, the body 422b may be configured to be rotatable in the range of 0 degrees to 100 degrees.

Further, the body 422b may have one end inserted into the air supply duct 425 and the other end protruding out of the air supply duct 425. In addition, the blowout nozzle 422c may be rotated under the control of the control unit 424. For example, the blowout nozzle 422c may include a plurality of servo motors (not shown) provided with a rubber roller or belt.

Moreover, the servo motor may transmit a rotational force of the motor to the body 422b through the rubber roller or belt so that the body 422b rotates. Thus, as the servo motor rotates, the body 422b of the blowout nozzle 422c may rotate. In addition, the servo motor may be rotated by receiving a power from the control unit 424. More specifically, a rotary shaft of the servo motor is connected to a rotary shaft of the rubber roller, and the rubber roller may press the outer surface of the body 422b according to the rotation of the servo motor. In addition, the body 422b may be rotated by the force transmitted by the rubber roller.

Further, the blowout nozzle 422c may be formed so that an end of the body 422b is opened to discharge the coolant. The blowout nozzle 422c may have a discharge hole K1 formed to communicate with the opening of the air supply duct 425 of the body 422b. In addition, a lip 422c1 protruding outward may be provided at the periphery of the discharge hole K1 of the blowout nozzle 422c to guide the discharge direction of the discharged coolant.

In addition, the shutter 422d may be a member configured to be movable to cover at least a portion of the discharge hole K1 of the blowout nozzle 422c. In other words, the shutter 422d may be regarded as a damper that controls the degree of opening and closing of the discharge hole K1 of the blowout nozzle 422c.

Also, the shutter 422d may be controlled by the control unit 424. The shutter 422d may open the discharge hole K1 of the blowout nozzle 422c to change the degree of opening from 1% to 100% in order to increase the amount of coolant discharged from the blowout nozzle 422c. Alternatively, as a converse example, the shutter 422d may change the degree of opening of the discharge hole K1 of the blowout nozzle 422c from 100% to 0% in order to reduce the amount of coolant discharged from the blowout nozzle 422c. Here, "the degree of opening" means the ratio of an opened area to a total area of the opening.

In addition, the shutter 422d may be positioned inside the body 422b. The shutter 422d may have a curved surface to be slidable along the inner surface of the body 422b. The blowout unit 422 may have a moving screw 422d1 capable of moving the location of the shutter 422d. That is, the shutter 422d may be configured to move along the inner surface of the body 422b by rotating the moving screw 422d1.

Also, the moving screw 422d1 may be adjusted by the control unit 424. For example, the moving screw 422d1 may be connected to the rotary shaft of the motor so as to receive the rotating force of the servo motor (not shown). In addition, the servo motor may receive a power by the control unit 424 to control the degree of rotation of the rotary shaft. That is, the control unit 424 may be configured to adjust the degree of opening and closing of the discharge hole K1 of the blowout nozzle 422c by moving the location of the shutter 422d.

Therefore, according to this configuration of the present disclosure, since the blowout unit 422 includes a fixing member 422a fixed to the air supply duct 425 and having an inlet formed to communicate with the inside of the air supply duct 425, a body 422b coupled to the fixing member 422a and having a curved surface so as to be rotatable in a state of being coupled, a blowout nozzle 422c formed by opening an end of the body 422b to discharge the coolant, and a shutter 422d configured to be movable to cover at least a portion of the opening of the blowout nozzle 422c, it is possible to efficiently control the discharge direction and the discharge amount of the coolant discharged by the blowout nozzle 422c. Accordingly, in the present disclosure, a specific battery pack 200 may be cooled more quickly among at least two battery packs 200.

Figure 6:
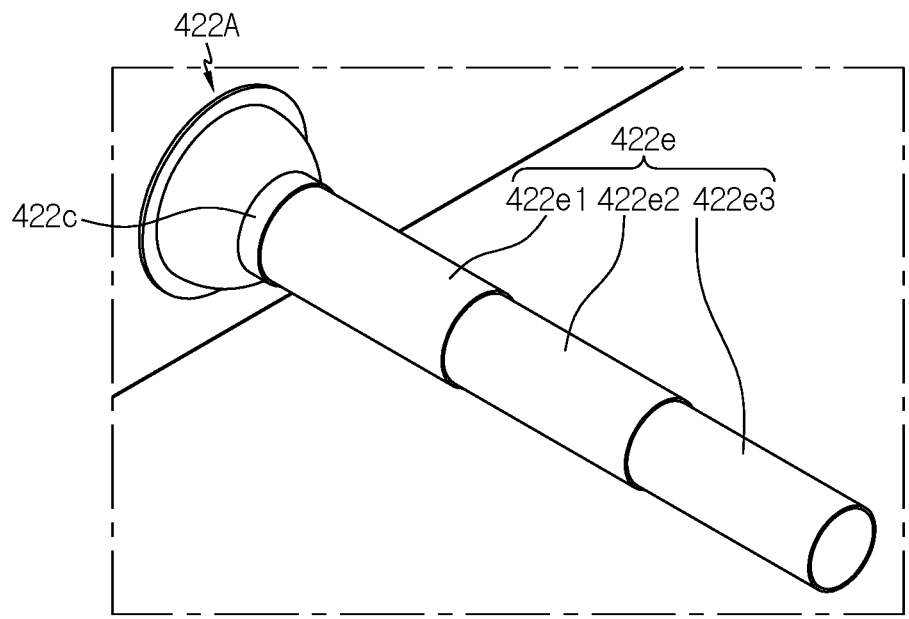
FIG. 6 is a partial perspective view schematically showing a blowout unit, employed at an energy storage apparatus according to another embodiment of the present disclosure.

FIG. 6 is a partial perspective view schematically showing a blowout unit, employed at an energy storage apparatus according to another embodiment of the present disclosure.

Referring to FIG. 6 along with FIGS. 2 and 4, the blowout unit 422A according to another embodiment may further include an elongated tube 422e in the blowout nozzle 422c, when compared with the blowout unit 422 of FIG. 5. The elongated tube 422e may be configured to change its length in the discharge direction according to the location of any one battery pack 200 among the at least two battery packs 200.

For example, the elongated tube 422e may include three tubes 422e1, 422e2, 422e3 connected to each other. The three tubes 422e1, 422e2, 422e3 may be configured to have different tube diameters. The three tubes 422e1, 422e2, 422e3 may be configured such that a tube located relatively farther from the fixing member 422a has a smaller diameter. In addition, among the three tubes 422e1, 422e2, 422e3, a tube having a relatively small tube diameter may be inserted into a tube having a relatively large tube diameter to be movable.

For example, the elongated tube 422e may have a first tube 422e1, a second tube 422e2, and a third tube 422e3. The elongated tube 422e may be configured such that its tube diameter is reduced step by step in the order of the first tube 422e1, the second tube 422e2 and the third tube 422e3. That is, the elongated tube 422e may be configured such that the second tube 422e2 is drawn out from the first tube 422e1 and the third tube 422e3 is drawn out from the second tube 422e2 in order to extend the entire tube length. Conversely, the elongated tube 422e may be configured such that the third tube 422e3 is inserted into the second tube 422e2 and the second tube 422e2 is inserted into the first tube 422e1 in order to reduce the total tube length.

Figure 7:
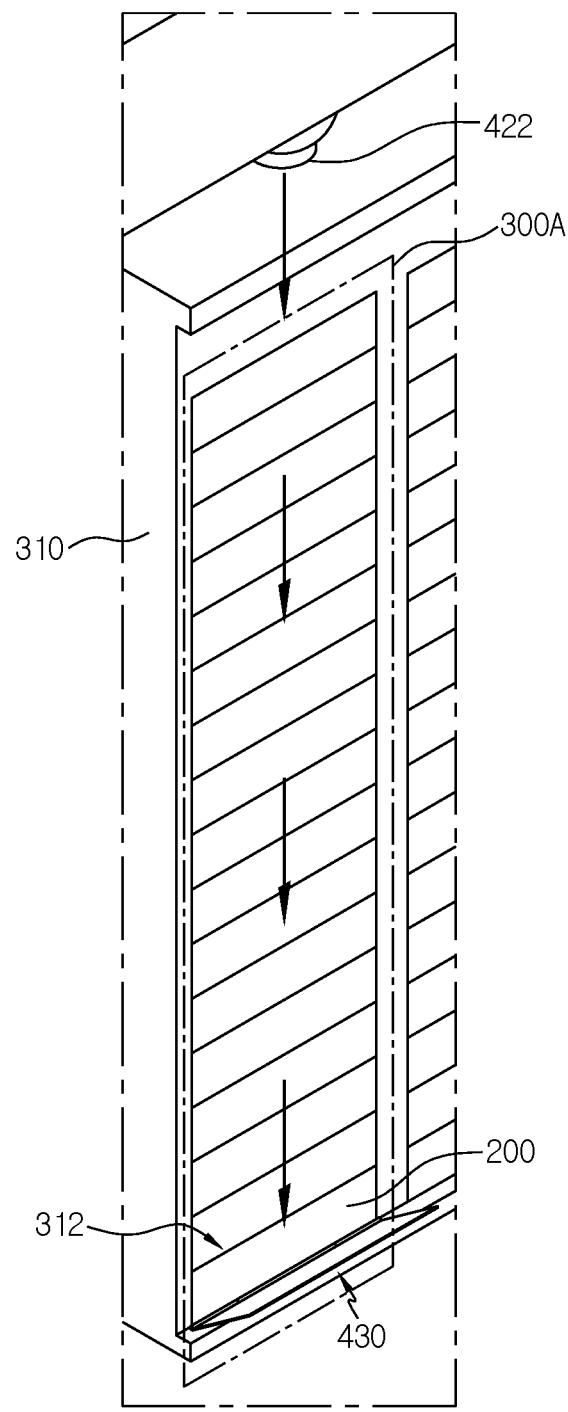
FIG. 7 is a partial perspective view schematically showing a battery rack according to another embodiment of the present disclosure.

FIG. 7 is a partial perspective view schematically showing a battery rack according to another embodiment of the present disclosure. Also, FIGS. 8 and 9 are perspective views schematically showing some components of the battery rack according to an embodiment of the present disclosure.

Figure 8:
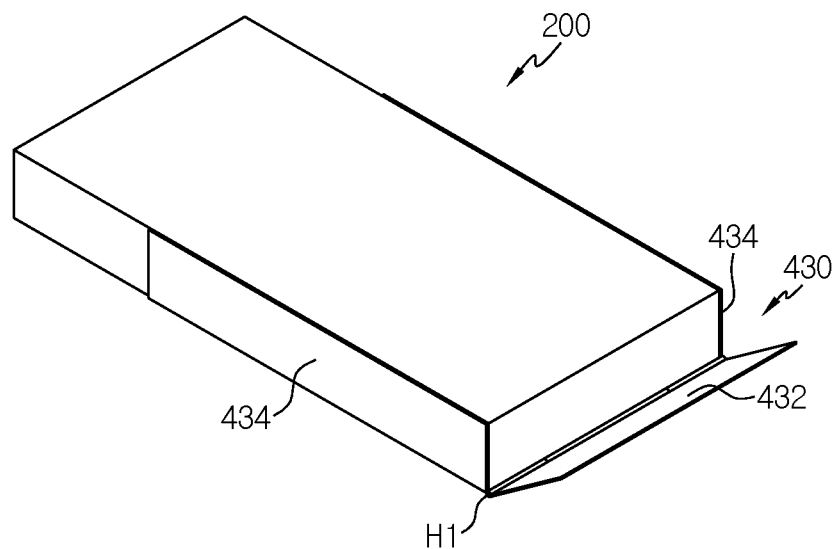
FIGS. 8 and 9 are perspective views schematically showing some components of the battery rack according to an embodiment of the present disclosure.
Figure 9:
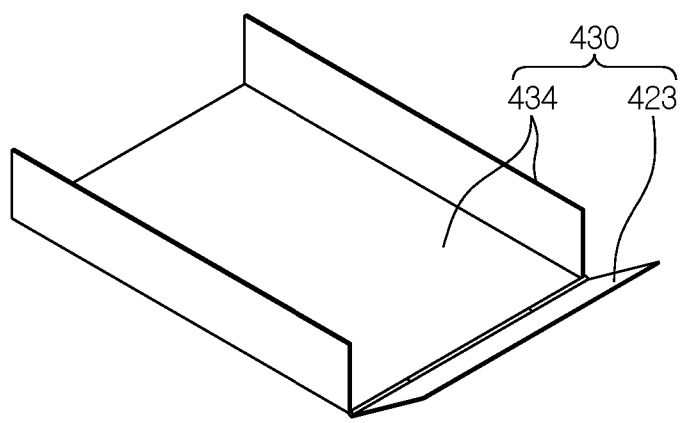

Referring to FIGS. 7 to 9, a battery rack 300A according to another embodiment of the present disclosure may further include a guide member 430, when compared with the battery rack 300 of FIG. 2. The guide member 430 may be provided in the accommodation portion 312 in which the battery pack 200 of the rack case 310 is mounted. The guide member 430 may include an inclined wall 432 protruding outward based on the location of the battery pack 200 so that the coolant discharged from the blowout unit 422 is guided to move to the battery pack 200.

For example, as shown in FIG. 7, the guide member 430 may be provided in the accommodation portion 312 that accommodates the battery pack 200 positioned at the bottom of the battery rack 300. The guide member 430 may include the inclined wall 432 protruding outward based on the location of the battery pack 200 so that the coolant may move to the battery pack 200. Accordingly, the guide member 430 may reduce the amount of coolant dispersed around the battery pack 200, thereby helping to perform effective point cooling.

Therefore, according to this configuration of the present disclosure, in the battery rack 300, since the guide member 430 having an inclined wall 432 protruding outward based on the location of the battery pack 200 is provided in the accommodation portion 312 in which the battery pack 200 is mounted so that the coolant is guided to move to the battery pack 200, it is possible to effectively deliver the coolant to the battery pack 200 located at a relatively far distance from the blowout unit 422 among the plurality of battery packs 200. In other words, in the present disclosure, by using the guide member 430, it is possible to solve the problem that after the blowout unit 422 discharges a cooling air, the point cooling efficiency deteriorates as the cooling air spreads seriously in all directions due to a long moving distance of the cooling air.

Meanwhile, referring to FIGS. 7 and 8 again along with FIG. 4, in the guide member 430, the inclined wall 432 may be configured to be connected using a hinge structure H1 so that the degree of outward protrusion thereof may be changed based on the location of the battery pack 200. In addition, the rotation of the inclined wall 432 may be controlled by the control unit 424. For example, a rotary shaft of the hinge structure H1 of the inclined wall 432 may be connected to a servo motor (not shown). The inclined wall 432 of the guide member 430 may be rotated to be unfolded to protrude outward or to be folded inward by rotation of the servo motor supplied with a power from the control unit 424.

Therefore, according to this configuration of the present disclosure, since the guide member 430 is connected using the hinge structure H1 so that the degree of outward protrusion of the inclined wall 432 may be changed based on the location of the battery pack 200, it is possible to increase the amount of coolant that comes into contact with a specific battery pack 200 by spreading the inclined wall 432 of the guide member 430. Accordingly, in the present disclosure, it is possible to solve the problem that the point cooling efficiency deteriorates according to the distance between the blowout unit 422 and the battery pack 200.

Moreover, the guide member 430 may include a conduction portion 434. The conduction portion 434 may be made of a thermally conductive material. For example, the thermally conductive material may be aluminum or copper. The conduction portion 434 may have a shape extending from an inner end of the inclined wall 432 into the battery rack 300. That is, the conduction portion 434 may be configured to contact at least a portion of the outer surface of the battery pack 200. In addition, the conduction portion 434 may conduct the heat received from the battery pack 200 to the inclined wall 432.

Therefore, according to this configuration of the present disclosure, since the guide member 430 includes a conduction portion 434 having a thermally conductive material and configured to extend from the inner end of the inclined wall 432 into the battery rack 300, it is possible to cool the rear portion of the battery pack 200 located inside the accommodation portion 312 of the battery rack 300. Accordingly, in the present disclosure, it is possible to maximize the point cooling efficiency of the battery pack 200 through the conduction portion 434 of the guide member 430.

Figure 10:
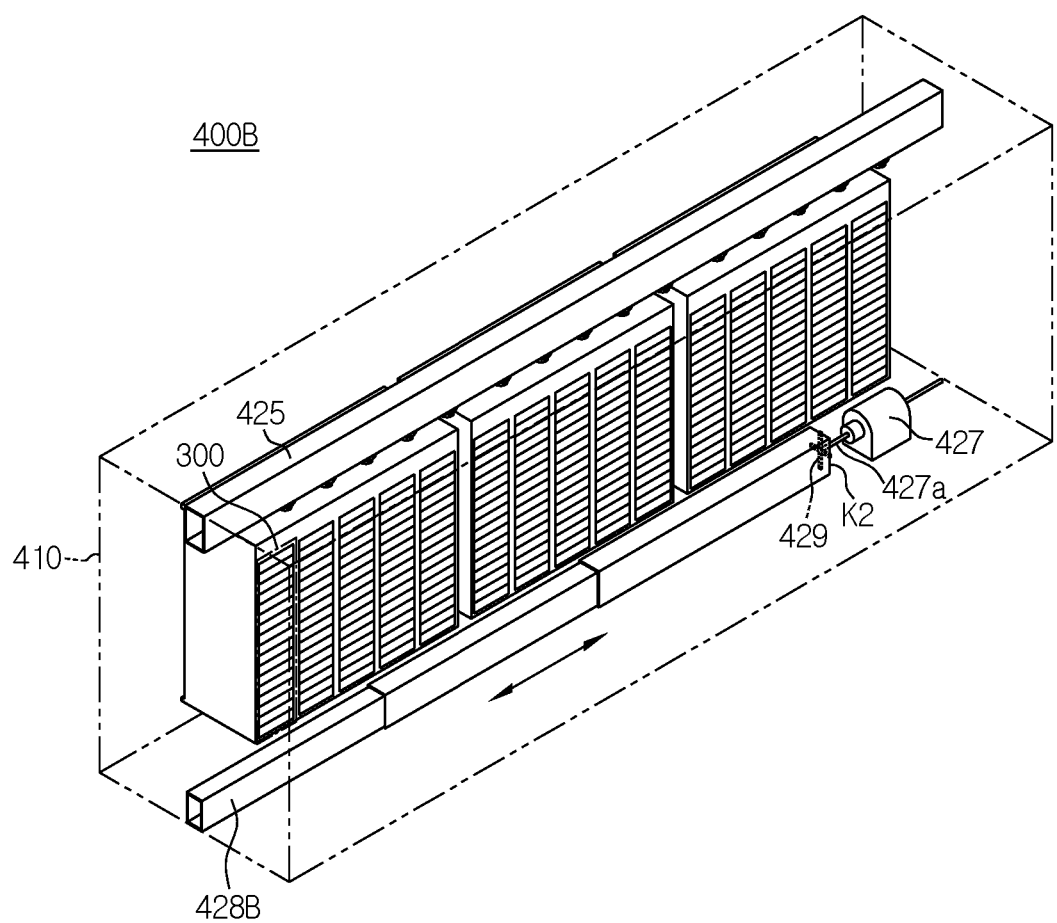
FIG. 10 is a perspective view schematically showing an internal configuration of an energy storage apparatus according to another embodiment of the present disclosure.

FIG. 10 is a perspective view schematically showing an internal configuration of an energy storage apparatus according to another embodiment of the present disclosure.

Referring to FIG. 10, in an energy storage apparatus 400B according to another embodiment of the present disclosure, unlike the energy storage apparatus 400 of FIG. 2, a suction duct 428B may extend into the container 410. In addition, the suction duct 428B may be configured such that the location of the suction hole K2 is movable. For example, the suction duct 428B may be configured such that at least a portion thereof may be moved. As the location of a portion of the suction duct 428B moves, the location of the suction hole K2 formed in the suction duct 428B may also be moved together.

For example, in the energy storage apparatus 400B of the present disclosure, when a plurality of battery racks 300 are provided, the location of the suction hole K2 of the suction duct 428B may be moved closer to the battery rack 300 having a relatively high temperature so that a coolant may be concentrated to the battery rack 300 in which the battery packs 200 mounted therein have a relatively high average temperature, among the plurality of battery racks 300.

At this time, the length of the suction duct 428B inserted into the container 410 may be controlled to decrease or increase. For example, the suction duct 428B may be configured by coupling a plurality of divided ducts. By using a pressing device 427 and a push bar 429 connected to a pressing shaft 427a of the pressing device 427, the extension length of the suction duct 428B may be reduced by pressing an extended end of the suction duct 428B in one direction.

Conversely, by using the push bar 429 connected to the pressing device 427, the extension length of the suction duct 428B may be increased by pulling a distal end of the suction duct 428B in the other direction. At this time, the push bar 429 may be connected to the end of the suction duct 428B. In addition, the control unit 424 (FIG. 4) of the air conditioner 420 may control a portion of the suction duct 428B to move by transmitting an electric signal so that the length of the suction duct 428B is increased or decreased.

Therefore, according to this configuration of the present disclosure, since the suction duct 428B is configured such that the location of the suction hole K2 is movable, it is possible to control a coolant to be concentrated to a battery rack 300 requiring more cooling among the plurality of battery racks 300. Accordingly, it is possible to effectively reduce the temperature deviation among the plurality of battery racks 300. Ultimately, it is possible to effectively extend the service life of the energy storage apparatus 400B.

Meanwhile, an energy storage system according to an embodiment of the present disclosure may include two or more energy storage apparatuses described above. In addition, the energy storage system may include a control tower that controls charging, discharging and power interruption of a plurality of energy storage apparatuses.

Hereinafter, in order to specifically describe the present disclosure, an example and an experimental example will be described in more detail, but the present disclosure is not limited by the example and the experimental example. The example according to the present disclosure may be modified into various different forms, and the scope of the present disclosure should not be construed as being limited to the example described below. The example of the present disclosure is provided to more perfectly explain the present disclosure to those skilled in the art.

Example 1

The energy storage apparatus 400 of Example 1 according to the present disclosure has the same configuration as the energy storage apparatus 400 shown in FIG. 2. That is, the energy storage apparatus 400 of Example 1 includes 30 battery racks provided in the container 410, and 17 battery packs 200 are arranged in an upper and lower direction in each battery rack 300. In addition, the air supply ducts 425 are provided at left and right top ends of the container 410, and 15 blowout units for supplying a coolant are formed to be spaced apart from each other at predetermined intervals. In addition, the suction holes K2 are formed in the front and rear walls of the container 410, respectively, so as to suck a heated coolant and discharge the sucked coolant to the outside. Moreover, the temperature sensor is provided on a portion of the outer surface of the battery pack 200 at a location close to the inner side of the accommodation portion of the rack case.

Comparative Example 1

Figure 11:
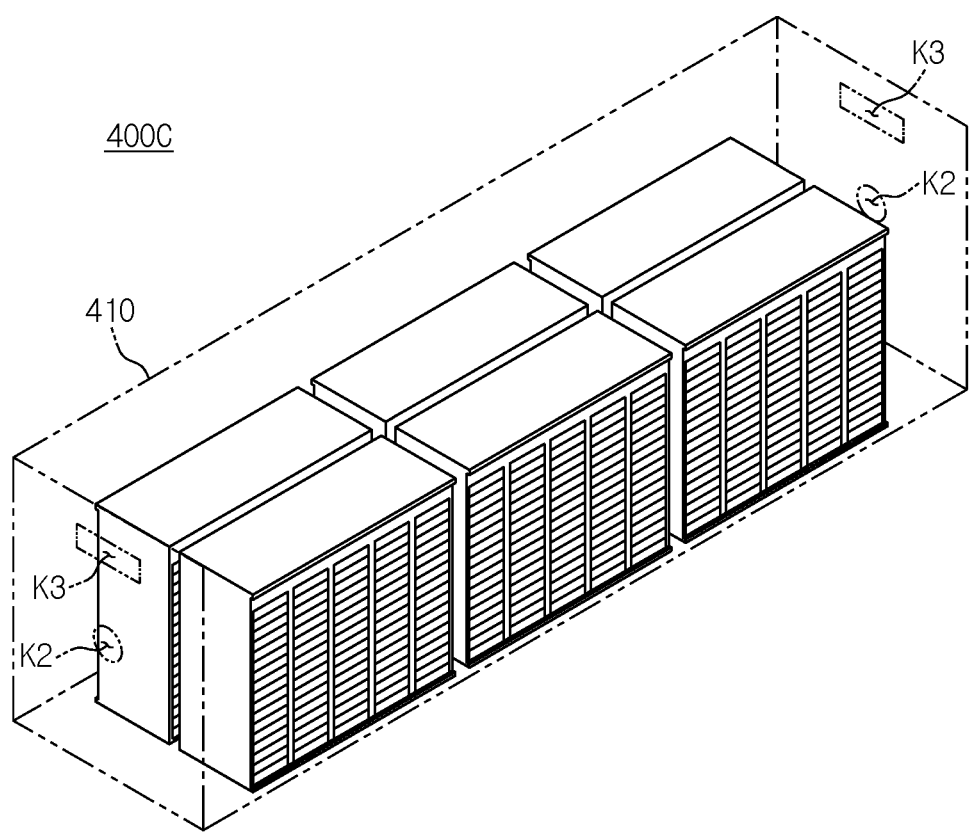
FIG. 11 is a perspective view schematically showing some components of an energy storage apparatus according to Comparative Example 1 of the present disclosure.

An energy storage apparatus 400C of Comparative Example 1 according to the present disclosure does not include an air supply duct and a blowout unit, as shown in FIG. 11, and supply holes K3 are formed at top ends of the front and rear walls of the container 410 instead. In addition, the suction holes K2 are formed in the front and rear walls of the container 410, respectively, so as to suck a heated coolant and discharge the sucked coolant to the outside. Other components are configured identical to those of the energy storage apparatus 400 of Example 1.

Experimental Example

The cooling performance of the energy storage apparatuses according to Example 1 and Comparative Example 1 of the present disclosure was evaluated by computational fluid dynamics simulation (C.F.D Simulation, product name: Siemens STAR-CCM+, version: 13.04.010), which simulates the interaction of fluid and gas through a computer. The specifications to which the simulation is applied are shown in the table of FIG. 12. In addition, the simulation experiment results of Example 1 and Comparative Example 1 are shown in the tables of FIGS. 13 and 14, respectively.

First, seeing the tables of FIGS. 13 and 14, when comparing the energy storage apparatuses of Example 1 and Comparative Example 1, the battery pack exhibiting the highest temperature in Example 1 was found to have a temperature lower than that of Comparative Example 1 by 1.19° C. (−3.81%). In addition, the battery pack exhibiting the lowest temperature in Example 1 was found to have a temperature lower than that of Comparative Example 1 by 0.27° C. (−1.01%). Moreover, it was found that the average temperature of the entire battery packs in Example 1 was lower than that of Comparative Example 1 by 1.09° C. (−3.79%). Further, the maximum deviation of the entire battery racks in Example 1 was reduced by 0.6° C. (−15.75%) compared to Comparative Example 1.

In conclusion, the energy storage apparatus of Example 1 according to the present disclosure was able to lower the average temperature of the entire battery packs by using the air supply duct having the blowout unit, compared to Comparative Example 1 not including the air supply duct. That is, the overall cooling performance of the battery packs provided to the energy storage apparatus was improved. In addition, by reducing the maximum deviation of the entire battery racks, it was found that the temperature imbalance among the battery racks was reduced. In other words, it was found that the energy storage apparatus had improved cooling efficiency and proper cooling air supply capacity.

Meanwhile, even though the terms indicating directions such as upper, lower, left, right, front and rear directions are used in the specification, it is obvious to those skilled in the art that these merely represent relative positions for convenience in explanation and may vary based on a position of an observer or an object.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

| Reference Signs | |
|---|---|
| 400: energy storage apparatus | 300: battery rack |
| 200: battery pack | 310: rack case |
| 410: container | 420: air conditioner |
| 422: blowout unit | 424: control unit |
| 421: coolant supply part | 426: coolant suction part |
| 425: air supply duct | 428: suction duct |
| 422a: fixing member | 422b: body |
| 422c: blowout nozzle | 422d: shutter |
| 422e: elongated tube | 430: guide member |
| 432: inclined wall | H1: hinge structure |
| 434: conduction portion | |

What is claimed is:

1. An energy storage apparatus, comprising:
at least one battery rack having at least two battery packs;
a container configured to accommodate the at least one battery rack; and
an air conditioner provided with a coolant supplier, the coolant supplier including:
at least two blowers, each blower respectively having a nozzle with a discharge hole through which a coolant is discharged and configured to individually switch a discharge direction of the coolant toward any one of the at least two battery packs and individually increase or decrease a discharge amount of the coolant; and
a control unit configured to adjust the discharge direction and the discharge amount of the coolant of each of the at least two blowers, and
a coolant suction part configured to suck a heated coolant inside the container.

2. The energy storage apparatus according to claim 1, wherein the control unit is configured to adjust the discharge direction of each of the at least two blowers so that the coolant is concentrated to a battery pack of the at least two battery packs exhibiting a relatively higher temperature.

3. The energy storage apparatus according to claim 1, wherein the control unit is configured to adjust the discharge amount of a first blower of the at least two blowers discharging the coolant toward a battery pack of the at least two battery packs exhibiting a relatively higher temperature to be greater than the discharge amount of a second blower of the at least two blowers.

4. The energy storage apparatus according to claim 1, wherein the coolant supplier includes an air supply duct having a moving passage for moving the coolant to the at least two blowers, and
wherein the coolant suction part includes a suction duct having a suction hole for sucking the coolant inside the container and configured to extend so that the coolant is moved to outside of the container.

5. The energy storage apparatus according to claim 4, wherein each blower of the at least two blowers includes:
a fixing member fixed to the air supply duct and having an inlet formed to communicate with the air supply duct;
a body coupled to the fixing member and configured to have a curved surface that is rotatable;
a blowout nozzle having a discharge hole formed by opening an end of the body to discharge the coolant; and
a shutter configured movably to cover at least a portion of the discharge hole of the blowout nozzle.

6. The energy storage apparatus according to claim 5, wherein the blowout nozzle includes an elongated tube configured to change in length in the discharge direction.

7. The energy storage apparatus according to claim 4, wherein the battery rack includes a guide member having an inclined wall configured to protrude outward based on a location of a battery pack of the at least two battery packs so that the coolant around the battery pack is guided to move to the battery pack.

8. The energy storage apparatus according to claim 7, wherein the inclined wall is connected using a hinge so that the degree of outward protrusion thereof is changed based on the location of the battery pack.

9. The energy storage apparatus according to claim 7, wherein the guide member includes a conduction portion made of a thermally conductive material and configured to extend into the battery rack from an inner end of the inclined wall.

10. The energy storage apparatus according to claim 4, wherein the suction duct is configured to be at least partially movable so that at least a portion of the suction hole is moved.

11. An energy storage system, comprising at least two energy storage apparatuses according to claim 1.

* * * * *